(12) United States Patent
Yamashita

(10) Patent No.: US 6,675,180 B2
(45) Date of Patent: Jan. 6, 2004

(54) DATA UPDATING APPARATUS THAT PERFORMS QUICK RESTORATION PROCESSING

(75) Inventor: Kazuhiko Yamashita, Kyotanabe (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 274 days.

(21) Appl. No.: 09/873,870

(22) Filed: Jun. 4, 2001

(65) Prior Publication Data
US 2001/0051954 A1 Dec. 13, 2001

(30) Foreign Application Priority Data
Jun. 6, 2000 (JP) .......................... 2000-168544

(51) Int. Cl.[7] .............................................. G06F 17/30
(52) U.S. Cl. ...................................................... 707/204
(58) Field of Search .............................. 707/104.1, 102, 707/201; 706/45; 711/162

(56) References Cited

U.S. PATENT DOCUMENTS

| | | | | |
|---|---|---|---|---|
| 5,276,872 A | * | 1/1994 | Lomet et al. ............... | 707/202 |
| 5,592,618 A | * | 1/1997 | Micka et al. ................ | 714/54 |
| 5,649,185 A | * | 7/1997 | Antognini et al. .......... | 707/9 |
| 5,787,445 A | * | 7/1998 | Daberko ..................... | 707/205 |
| 5,835,953 A | * | 11/1998 | Ohran ........................ | 711/162 |
| 6,453,383 B1 | * | 9/2002 | Stoddard et al. ........... | 711/112 |
| 6,457,021 B1 | * | 9/2002 | Berkowitz et al. ......... | 707/201 |

* cited by examiner

Primary Examiner—Safet Metjahic
Assistant Examiner—Sana Al-hashemi

(57) ABSTRACT

A data updating apparatus updates a plurality of pieces of data that constitutes a file in a storage medium. The storage medium stores (a) first and second FATs which indicate data storage locations and data sequences and (b) file indexes which each correspond to a file and associate a file name with a storage location of a top piece of data of a file. In the data updating apparatus, an updating unit updates the first FAT, the corresponding file index, and the second FAT in the stated order in updating of the file; a temporary index generating unit generates a temporary index including a storage location of the corresponding file index and new contents of the corresponding file index, and writes it into the storage medium before the first FAT updating; and a temporary index deleting unit deletes the temporary index from the storage medium after the second FAT updating.

8 Claims, 8 Drawing Sheets

FIG.5

TEMPORARY INDEX 129

| | |
|---|---|
| 301 — FILE NAME | File2.doc |
| 302 — ENTRY CLUSTER NUMBER | 2101 |
| 303 — DATA SIZE (KB) | 200KB |
| 304 — ATTRIBUTE | Writable |
| 305 — TIME STAMP | 00/12/10/12:03 |
| 306 — SECTOR NUMBER | 200 |
| 307 — FLAG | 1 |

FIG.8

| STEP | | BEFORE UPDATING | S101 | S102 | S103 | S104 | S105 | S106 | S107(AFTER UPDATING) |
|---|---|---|---|---|---|---|---|---|---|
| | OLD DATA | EXIST | EXIST | EXIST | EXIST | EXIST | EXIST | NOT EXIST | NOT EXIST |
| | NEW DATA | NOT EXIST | EXIST | EXIST | EXIST | EXIST | EXIST | EXIST | EXIST |
| JUDGEMENT OF FILE INDEX COMPARING UNIT | | NO TEMPORARY INDEX | NO TEMPORARY INDEX | MISMATCH | MISMATCH | MATCH | MATCH | MATCH | NO TEMPORARY INDEX |
| | FILE INDEX | OLD | OLD | OLD | OLD | NEW | NEW | NEW | NEW |
| | TEMPORARY INDEX | NOT EXIST | NOT EXIST | EXIST | EXIST | EXIST | EXIST | EXIST | NOT EXIST |
| JUDGEMENT OF FAT COMPARING UNIT | | MATCH | MATCH | MATCH | MISMATCH | MISMATCH | MATCH | MATCH | MATCH |
| | FIRST FAT | OLD | OLD RESTORE | OLD RESTORE OLD | NEW | NEW | NEW | NEW | NEW |
| | SECOND FAT | OLD | OLD | OLD | OLD | OLD | NEW | NEW | NEW |
| AFTER RESTORING | | OLD | OLD | OLD | OLD | NEW | NEW | NEW | NEW |

DATA UPDATING APPARATUS THAT PERFORMS QUICK RESTORATION PROCESSING

BACKGROUND OF THE INVENTION (1) Field of the Invention

The present invention relates to a data updating apparatus that writes data into a storage medium such as a semiconductor memory, a magnetic disc, and an optical magnetic disc, and especially relates to a technique of restoring consistency after abnormality in data writing causes inconsistency between file management information and the actual storage state of data which constitutes a file.

(2) Prior Art

Information equipment such as a personal computer writes data into a storage medium such as a hard disc, based on a file system. In a file system to write data not into contiguous memory locations in a storage medium but divide the data into pieces (hereinafter called "divided pieces of data") and write them into clusters, a FAT (File Allocation Table) and a file index are used. Here, the FAT shows information such as locations of the clusters storing the divided pieces of data and the sequence in which they form a file (hereinafter called "data sequence"). The file index associates a name of the file and a storage location where the top divided piece of data is stored.

The information equipment reads/writes the data from the top divided piece of data to the last divided piece of data in accordance with the FAT and the file index by sequentially tracing the clusters storing the divided pieces of data.

Conventionally, a data updating apparatus is used to update data in the information equipment which employs the file system including the FAT.

FIG. 1 is a functional block diagram showing a conventional data updating apparatus 1000.

The data updating apparatus 1000 is roughly made up of a storage medium 1001, a CPU (Central Processing Unit) 1002, and a RAM (Random Access Memory) 1003, each of which is connected by a bus. The CPU 1002 controls reading/writing of data from/into the storage medium 1001, and the RAM 1003 temporarily stores the data written or read by the CPU 1002.

The storage medium 1001 stores a first FAT 1005, a second FAT 1006 which are obtained by duplexing a FAT, file indexes 1007, 1008, 1009, . . . , and divided pieces of data 1010, 1011, 1012, . . . .

FIG. 2 shows the relationship between the first FAT 1005, the second FAT 1006, the file indexes 1007, 1008, 1009, . . . , and a data storage area 1260.

First, the file indexes 1007, 1008, 1009, . . . , are explained.

File indexes 1007, 1008, 1009, . . . , are tables which are each generated for a file. Since their data structures are the same, the file index 1007 is explained here as an example.

A file name field 1211 shows a filename "File1.doc",; an entry cluster number field 1222 shows a number "2101" of a cluster storing the top divided piece of data of the file; a data size field 1223 shows a total data size "93" of the file in kilo bytes; an attribute field 1224 shows an attribute "writable" of the file; and a time stamp field 1225 shows "00/11/02/11:28", which is a date and a time when the file index 1007 was generated or updated.

Next, the first FAT 1005 and the second FAT 1006 are explained.

Although usually one FAT is sufficient, the FAT is duplexed to be the first FAT 1005 and the second FAT 1006 for backup in case of abnormality during FAT updating. Since the contents of the first FAT 1005 and the second FAT 1006 are the same, the first FAT 1005 is explained here as an example.

The first FAT 1005 is used for tracing the clusters which store the divided pieces of data in the data sequence.

Each cluster is composed of several sectors, which are the smallest storage units on the storage medium 1001.

A cluster number column 1241 shows a number which specifies a cluster, namely a cluster number.

A pointer column 1242 shows a cluster number of a cluster storing a divided piece of data immediately following a divided piece of data stored in the cluster shown by the cluster number column 1241.

Here, if there is no following divided piece of data, the pointer column 1242 shows an End code which indicates that the following divided piece of data does not exist.

Next, the storage state of the divided pieces of data in the clusters is explained.

A data storage area 1260 is a group of clusters. Each cluster stores one of the divided pieces of data, based on the locations of the clusters and the data sequence indicated by the first FAT 1005 and the second FAT 1006.

That is to say, to obtain data of the file name "File1.doc", the CPU 1002 searches the file indexes 1007, 1008, 1009, . . . for the file name "File1.doc", obtains the file index 1007 which shows the file name "File1.doc", and obtains the entry cluster number "2101".

Next, the CPU 1002 obtains a pointer "2106" with reference to the entry cluster number "2101" in the first FAT 1005, then obtains a pointer "2108" with reference to the cluster number "2106", and finally obtains the End code with reference to the cluster number "2108".

As a result, the CPU 1002 finds out that the data of the file name "File1.doc" is made up of the divided pieces of data 1010, 1011, and 1012 that are stored in the clusters with the cluster numbers "2101", "2106", and "2108" in sequence. The CPU 1002 then reads the divided pieces of data from the clusters and assembles them, to obtain the data of the file.

When performing file updating by appending or changing data, the CPU 1002 first stores new divided pieces of data necessary for the updating into available clusters, then changes the contents of a corresponding file index such as a data size, updates the cluster numbers and the pointers in the FATs, and deletes divided pieces of data which become unnecessary from clusters.

Here, when updating a file only slightly, not all the divided pieces of data that form the file are subjected to the updating, but only part of them is subjected to the updating in units of clusters.

During such updating, if the updating of one of the FATs is interrupted due to a power failure or the like, the pointer rewriting in the first FAT 1005 or the second FAT 1006 will result in incompletion. This incompletion causes inconsistency with both states of pointers of before and after updating. Even if all of the divided pieces of data are stored in the clusters properly, the CPU 1002 cannot properly recognize their storage locations and sequence, and therefore cannot read the file properly.

To prevent this inconvenience, the CPU 1002 restores to a consistent state in rebooting of the data updating apparatus 1000.

That is to say, when the updating of the first FAT 1005 or the second FAT 1006 is interrupted, the CPU 1002 checks the inconsistency between the first FAT 1005, the second FAT 1006, the file indexes 1007, 1008, 1009, . . . , and the clusters. One of the first FAT 1005 and the second FAT 1006, which has consistency, is used as a proper FAT, and the other is changed so as to be the same as the proper FAT. This processing restores to a consistent state.

As for the file indexes, since the data size of each index is small enough to store in one sector, it is not assumed here that the updating of any of the file indexes 1007, 1008, 1009, . . . , is interrupted.

In recent years, a variety of digital information household electrical appliances such as digital televisions and game machines, which receive information such as video, audio, and data and write it into a storage medium such as a hard disc.

These digital information household electrical appliances are equipped with data updating apparatuses similar to those in personal computers.

The above conventional restoration processing has the following problem.

The conventional restoration processing takes a long time to check the inconsistency between the first FAT 1005, the second FAT 1006, the file indexes 1007, 1008, 1009, . . . , and the clusters. Accordingly, the data updating apparatus takes a long time until it resumes to read/write data.

Therefore, especially users of digital information household electrical appliances such as the digital televisions and the game machines that are based on real time processing are likely to be irritated.

SUMMARY OF THE INVENTION

The present invention is led in consideration of the above problem, and the first object of the present invention is to provide a data updating apparatus that can shorten the restoration processing time.

Also, the second object of the present invention is to provide a data updating method that can perform the above improved restoration processing.

Furthermore, the third object of the present invention is to provide a storage medium storing a program that shortens the restoration processing time.

The first object is achieved by a data updating apparatus for updating a file in a storage medium which stores: (a) one or more files including the file to be updated, each of which includes a plurality of pieces of data, (b) a first table and a second table which both indicate a storage location of each piece of data and a sequence of the plurality of pieces of data of each file, and (c) one or more pieces of index information which are in a one-to-one correspondence with the one or more files and each associate a file name with a storage location of a predetermined piece of data of a file, the data updating apparatus including: a unit for updating the first table, a piece of index information corresponding to the file to be updated, and the second table in the stated order in updating of the file; a unit for generating and writing index identifying information into the storage medium before the first table is updated, the index identifying information including (i) address information which shows a storage location of the corresponding piece of index information and (ii) new contents to which the corresponding piece of index information is to be updated; and a unit for deleting the index identifying information from the storage medium after the second table is updated.

With this construction, if restoration processing is to be performed when the index identifying information exists in the storage medium after the file updating results in incompletion, the need of restoration processing can be easily judged by judging whether the index identifying information exists or not. Accordingly, restoration processing can be started soon.

The data updating apparatus further includes: a unit for judging whether the index identifying information exists in the storage medium after the updating of the file results in incompletion; and a unit for, when the index identifying information exists, restoring consistency by (a) reading the corresponding piece of index information specified by the address information, (b) comparing contents of the corresponding piece of index information with the new contents of the corresponding piece of index information included in the index identifying information, and (c) restoring consistency by (i) changing the second table so as to have same contents as the first table when the contents of the corresponding piece of index information match the new contents of the corresponding piece of index information, and (ii) changing the first table so as to have same contents as the second table when the contents of the corresponding piece of index information are different from the new contents of the corresponding piece of index information.

With this construction, the need of the restoration processing can be easily judged by judging whether the index identifying information exists or not. The data updating apparatus then obtains the corresponding piece of index information, based on the address information, and changes one of the first table and the second table so as to have the same contents as the other in accordance with the result of comparing the contents of the corresponding piece of index information with the new contents of the corresponding piece of index information included in the index identifying information. Consequently, without comparing these tables with the storage state of the plurality of pieces of data, the restoration processing of the first table and the second table is performed. As a result, a restoration processing time is shortened.

In the data updating apparatus, the index identifying information generating/writing unit sets a predetermined bit in the storage medium to a first value when writing the index identifying information, the index identifying information deleting unit sets the predetermined bit to a second value which is different from the first value when deleting the index identifying information, and the judging unit performs the judging, based on the predetermined bit.

With this construction, the need of restoration processing can be easily judged only by referring to the value in the predetermined bit.

Also, in the data updating apparatus, the restoring unit deletes the index identifying information from the storage medium and sets the predetermined bit to the second value after completing the restoring.

With this construction, in the second or later restoration processing, the need of restoration processing can be easily judged only by referring to the value in the predetermined bit.

In the data updating apparatus, the restoring unit deletes the index identifying information from the storage medium after completing the restoring.

With this construction, in the second or later restoration processing, the need of restoration processing can be easily judged by judging whether the index identifying information exists or not.

The second object is achieved by a data updating method for updating a file in a storage medium which stores: (a) one or more files including the file to be updated, each of which includes a plurality of pieces of data, (b) a first table and a second table which both indicate a storage location of each piece of data and a sequence of the plurality of pieces of data of each file, and (c) one or more pieces of index information which are in a one-to-one correspondence with the one or more files and each associate a file name with a storage location of a predetermined piece of data of a file, the data updating method including the steps of: updating the first table, a piece of index information corresponding to the file to be updated, and the second table in the stated order in updating of the file; generating and writing index identifying information into the storage medium before the first table is updated, the index identifying information including (i) address information which shows a storage location of the corresponding piece of index information and (ii) new contents to which the corresponding piece of index information is to be updated; and deleting the index identifying information from the storage medium after the second table is updated.

With this construction, if restoration processing is to be performed when the index identifying information exists in the storage medium after the file updating results in incompletion, the need of restoration processing can be easily judged by judging whether the index identifying information exists or not. Accordingly, restoration processing can be started soon.

The data updating method further includes the steps of: judging whether the index identifying information exists in the storage medium after the updating of the file results in incompletion; and restoring consistency by, when the index identifying information exists, (a) reading the corresponding piece of index information specified by the address information, (b) comparing contents of the corresponding piece of index information with the new contents of the corresponding piece of index information included in the index identifying information, and (c) restoring consistency by (i) changing the second table so as to have same contents as the first table when the contents of the corresponding piece of index information match the new contents of the corresponding piece of index information, and (ii) changing the first table so as to have same contents as the second table when the contents of the corresponding piece of index information are different from the new contents of the corresponding piece of index information.

With this construction, the need of the restoration processing can be easily judged by judging whether the index identifying information exists or not. The data updating apparatus then obtains the corresponding piece of index information, based on the address information, and changes one of the first table and the second table so as to have the same contents as the other in accordance with the result of comparing the contents of the corresponding piece of index information with the new contents of the corresponding piece of index information included in the index identifying information. Consequently, without comparing these tables with the storage state of the plurality of pieces of data, the restoration processing of the first table and the second table is performed. As a result, a restoration processing time is shortened.

The third object is achieved by a computer-readable storage medium that stores a data updating program to update a file in a storage medium which stores: (a) one or more files including the file to be updated, each of which includes a plurality of pieces of data, (b) a first table and a second table which both indicate a storage location of each piece of data and a sequence of the plurality of pieces of data of each file, and (c) one or more pieces of index information which are in a one-to-one correspondence with the one or more files and each associate a file name with a storage location of a predetermined piece of data of a file, the data updating program including the steps of: updating the first table, a piece of index information corresponding to the file to be updated, and the second table in the stated order in updating of the file; generating and writing index identifying information into the storage medium before the first table is updated, the index identifying information including (i) address information which shows a storage location of the corresponding piece of index information and (ii) new contents to which the corresponding piece of index information is to be updated; and deleting the index identifying information from the storage medium after the second table is updated.

With this construction, if restoration processing is to be performed when the index identifying information exists in the storage medium after the file updating results in incompletion, the need of restoration processing can be easily judged by judging whether the index identifying information exists or not. Accordingly, restoration processing can be started soon.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 shows a logical structure of a temporary index which is temporarily stored in the storage unit during data updating;

FIG. 8 shows the states of old data, new data, a file index, a temporary index, the first FAT, and the second FAT after each step in the flowchart of the FIG. 7.

DESCRIPTION OF THE PREFERRED EMBODIMENT

The following describes a data recording apparatus in a preferred embodiment of the present invention with reference to the drawings.

<Data Recording Apparatus>

Figure 1:
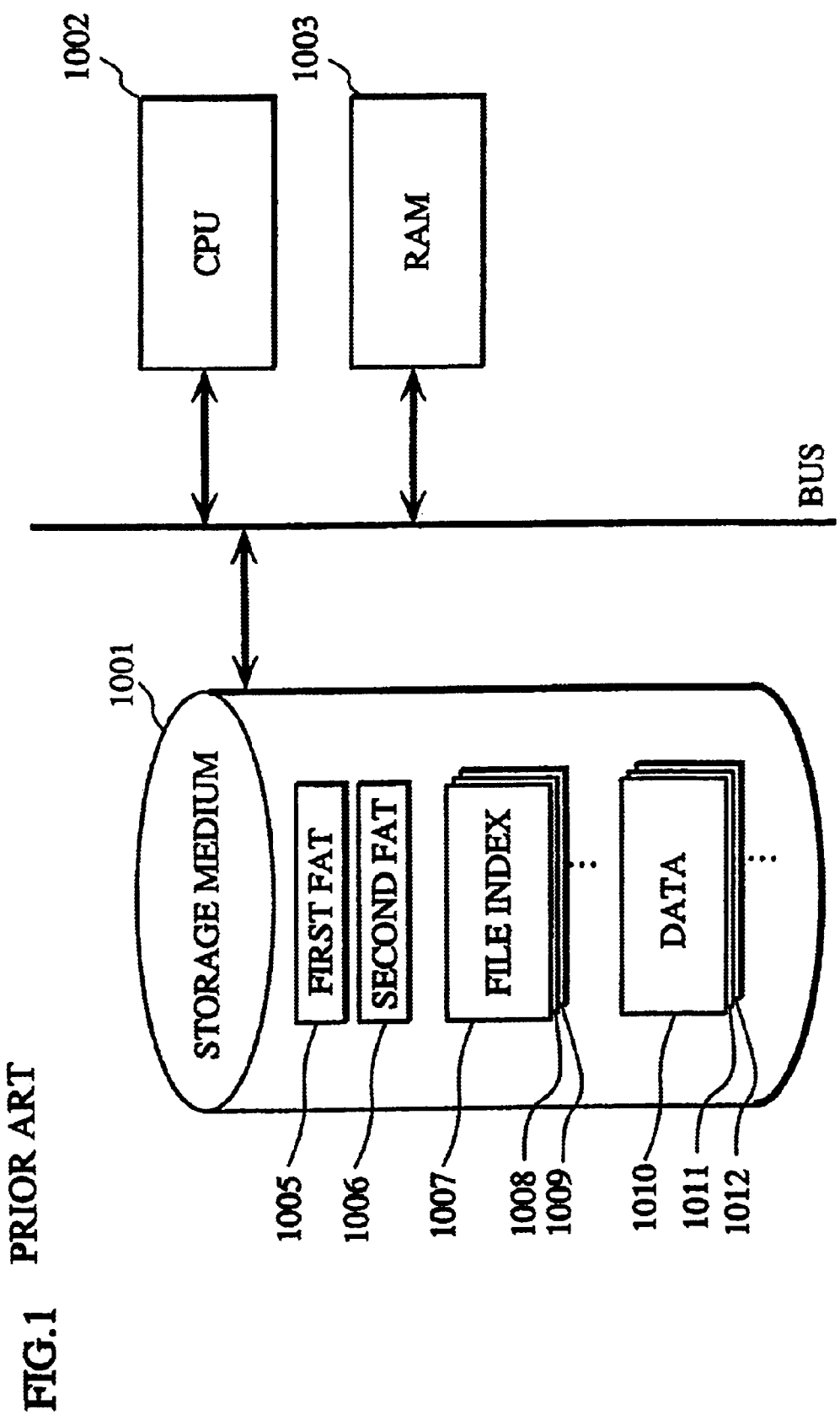
FIG. 1 is a functional block diagram showing a conventional data updating apparatus.
Figure 2:
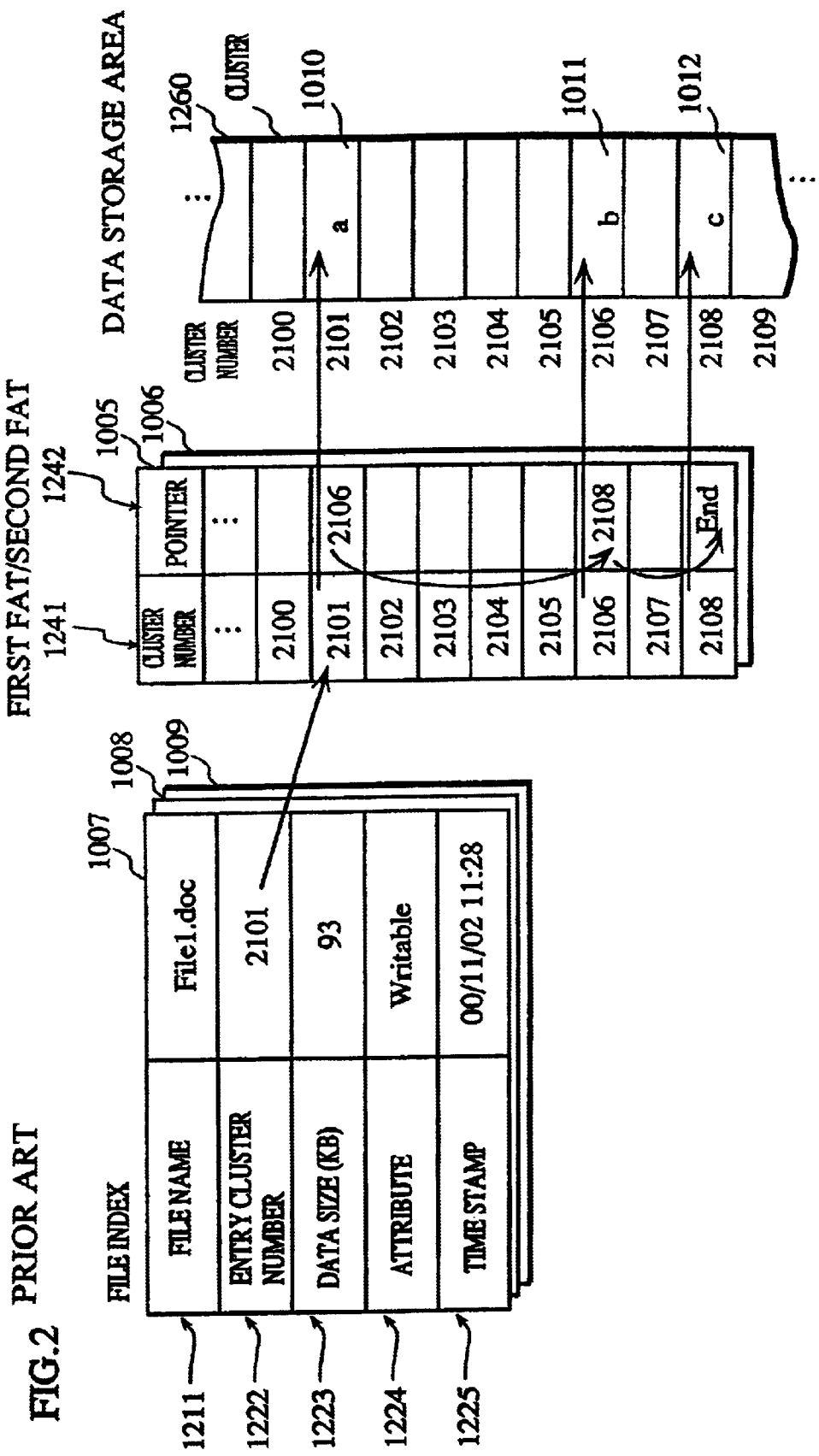
FIG. 2 shows the relationship between the first FAT, the second FAT, the file indexes, and the data storage area of the conventional data updating apparatus.
Figure 3:
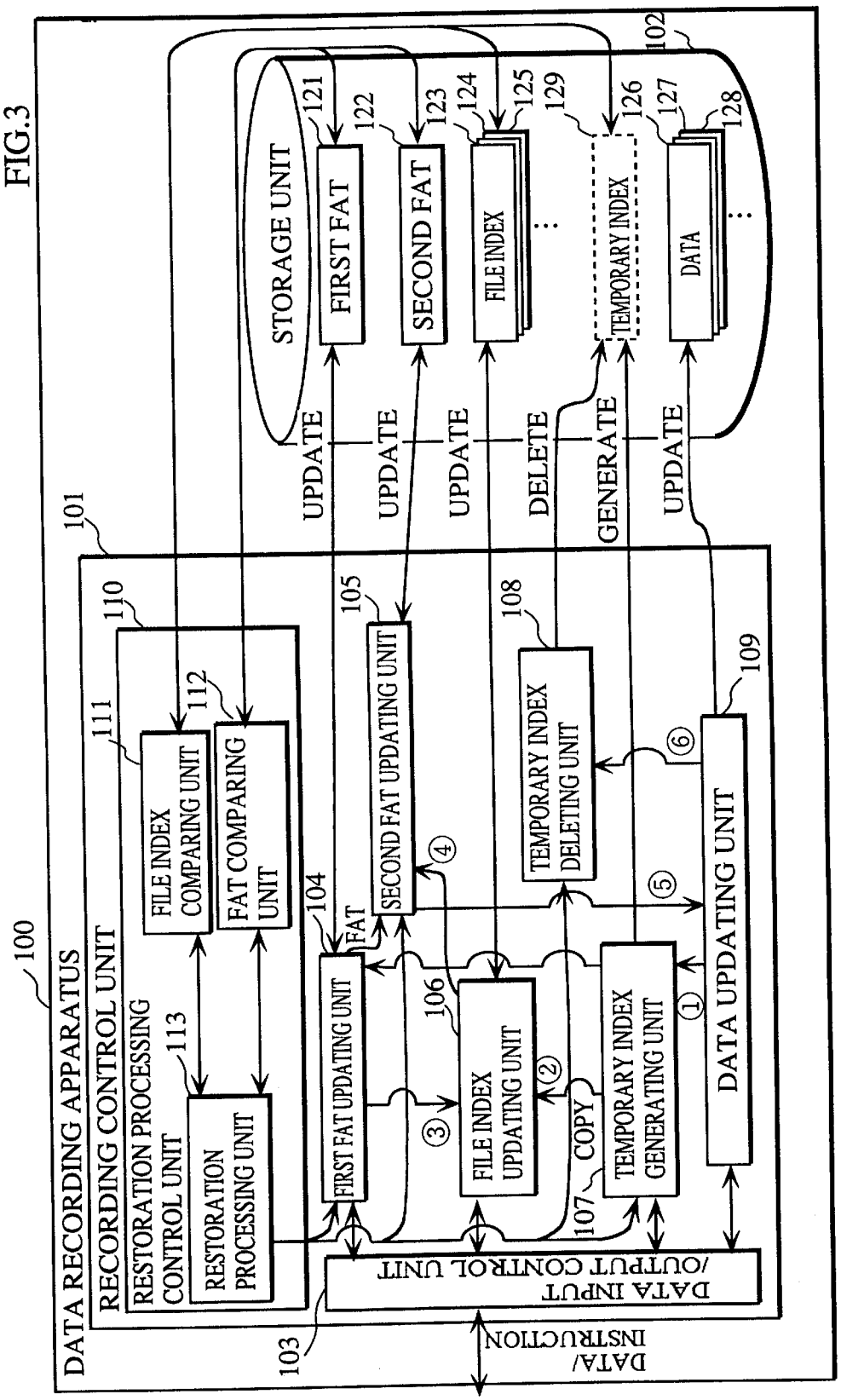
FIG. 3 is a functional block diagram showing a data recording apparatus in an embodiment of the present invention.

FIG. 3 is a functional block diagram showing a data recording apparatus 100 in the embodiment of the present invention.

The data recording apparatus 100 is an apparatus for reading/writing data and includes a recording control unit 101 which controls reading/writing of data and a storage unit 102 which stores the data. The data recording apparatus 100 also performs processing of restoring consistency when rebooting after data updating is interrupted. This processing is hereinafter called "restoration processing".

Here, since the present invention is effective to update data stored in the storage unit 102 by changing or appending the data, the following description is limited to the updating of the data stored in the storage unit 102.

The storage unit 102 is a storage medium such as a hard disc and has a storage area which is divided by sector and cluster. Each cluster is assigned a number to specify its physical storage location.

Also, the storage unit 102 stores a first FAT 121, a second FAT 122, file indexes 123, 124, 125, . . . , and pieces of data 126, 127, 128, . . . .

In addition, only during processing of updating the first FAT 121, the second FAT 122, the file indexes 123, 124, 125, . . . (hereinafter called "update processing"), a temporary index 129 exists in the storage unit 102.

The recording control unit 101 has a CPU and a storage medium such as a ROM (Read Only Memory) and is roughly made up of the following functional units: a data input/output control unit 103, a first FAT updating unit 104, a second FAT updating unit 105, a file index updating unit 106, a temporary index generating unit 107, a temporary index deleting unit 108, a data updating unit 109, and a restoration processing control unit 110.

The data input/output control unit 103 has a RAM storing data temporarily and controls input/output of the data in the storage unit 102. For example, when receiving an instruction to update a file named "File1.doc" and data of the file used for updating (hereinafter called "update data"), the data input/output control unit 103 instructs the file index updating unit 106 to obtain a file index which shows the file name "File1.doc" and obtains the file index 123 from the file index updating unit 106.

Also, the data input/output control unit 103 instructs the first FAT updating unit 104 to obtain the first FAT 121 and obtains the first FAT 121 from the first FAT updating unit 104. After that, with reference to the file index 123 and the first FAT 121, the data input/output control unit 103 recognizes numbers (cluster numbers) assigned to clusters which store existing divided pieces of data of the file named "File1.doc", the sequence of the clusters which pointers indicate, namely data sequence, and available clusters. Then the data input/output control unit 103 calculates the number of clusters necessary to store the update data, allocates some more available clusters, and determines a new data sequence.

Moreover, the data input/output control unit 103 outputs (a) the cluster numbers and the data sequence (they are hereinafter called "FAT information") to the first FAT updating unit 104, (b) the FAT information and the update data to the data updating unit 109, and (c) an updating instruction and the FAT information to the temporary index generating unit 107.

When receiving the FAT information and the update data, the data updating unit 109 divides the update data by cluster and writes them into the clusters from the top divided piece in sequence in accordance with the FAT information. After completing writing all of the divided pieces of data, the data updating unit 109 outputs a notification that this writing has been completed (hereinafter called "data writing completion notification", ① in FIG. 3) to the temporary index generating unit 107.

Also, when receiving a notification that updating of the second FAT has been completed (hereinafter called "second FAT updating completion notification", ⑤ in FIG. 3) from the second FAT updating unit 105, the data updating unit 109 deletes divided pieces of data which become unnecessary after the data updating and outputs a notification that this deleting has been completed (hereinafter called "data deleting notification", ⑥ in FIG. 3) to the temporary index deleting unit 108.

When receiving the data deleting notification from the data updating unit 109, the temporary index deleting unit 108 deletes the temporary index 129 from the storage unit 102. This deleting is performed by changing a flag included in the temporary index 129 from 1 to 0 and clearing other information except the flag included in the temporary index 129. The flag indicates that the temporary index 129 exists or not.

When receiving the data writing completion notification from the data updating unit 109, the temporary index generating unit 107 generates a new temporary index 129 in accordance with the updating instruction and the FAT information which received from the data input/output control unit 103, stores it in one sector of the storage unit 102 allocated specifically for storing the temporary index 129, and outputs a notification that this storing has been completed (hereinafter called "storing completion notification", ② in FIG. 3) to the first FAT updating unit 104.

Since one sector is so small that storing in one sector is completed for a moment, it is not assumed that abnormality such as interruption of writing occurs.

The temporary index generating unit 107 also outputs this temporary index 129 to the file index updating unit 106.

The first FAT updating unit 104 reads the first FAT 121 from the storage unit 102 in accordance with an instruction by the data input/output control 103 and outputs it to the data input/output control unit 103.

Also, when receiving (a) the FAT information from the data input/output control unit 103 and (b) the storing completion notification from the temporary index generating unit 107, the first FAT updating unit 104 updates the first FAT 121 stored in a first FAT storage area, based on the FAT information. Here, the first FAT storage area is a part of the storage area of the storage unit 102, which is allocated specifically for storing the first FAT 121.

Additionally, when receiving an instruction to write the second FAT 122 over the first FAT 121 from the restoration processing unit 113 in restoration processing, the first FAT updating unit 104 obtains the second FAT 122 in the storage unit 102 through the second FAT updating unit 105 and writes it into the first FAT storage area as the proper first FAT 121.

Then, the first FAT updating unit 104 outputs a notification that this updating has been completed (hereinafter called "first FAT updating completion notification, ③ in FIG. 3) to the file index updating unit 106.

The file index updating 106 reads one file index from the storage unit 102 in accordance with an instruction by the data input/output control 103 and outputs it to the data input/output control unit 103.

Next, when receiving the first FAT updating completion notification from the first FAT updating unit 104, the file index updating unit 106 updates a file name, an entry cluster number, a data size, an attribute, and a time stamp (they are hereinafter called "index main items") in the file index using the temporary index 129 which is received from the temporary index generating unit 107. Then, the file index updating unit 106 outputs a notification that this updating has been completed (hereinafter called "file index updating completion notification", ④ in FIG. 3) to the second FAT updating unit 105.

More specifically, when appending data, the file index updating unit 106 stores a corresponding file index in one of available sectors allocated specifically for storing file indexes in the storage unit 102. On the other hand, when changing existing data, the file index updating unit 106 writes a new corresponding file index over the existing file index which shows the file name related to this data.

Here, in the same way as the temporary index generating unit 107, since one sector is so small that writing into one sector is completed for a moment, it is not assumed that abnormality such as interruption of writing occurs.

When receiving the file index updating completion notification from the file index updating unit 106, the second FAT updating unit 105 obtains the new first FAT 121 from the first FAT updating unit 104 and updates the second FAT 122 by writing the new first FAT 121 over the existing second FAT in a second FAT storage area as the new second FAT 122. Here, the second FAT storage area is a part of the storage area of the storage unit 102, which is allocated specifically for storing the second FAT 122.

When receiving an instruction to write the first FAT 121 over the second FAT 122 from the restoration processing unit 113 in restoration processing, the second FAT updating unit 105 obtains the first FAT 121 in the storage unit 102 through the first FAT updating unit 104 and writes it into the second FAT storage area as the proper second FAT 122.

Then, the second FAT updating unit 105 outputs the second FAT updating completion notification to the data updating unit 109.

So far the update processing by the functional units such as changing or appending data is described. However, when just reading data of a file, the data input/output control unit 103 obtains the data of the file as the following. First the data input/output control unit 103 instructs the file index updating unit 106 to read a corresponding file index that shows a name of the file using the file name as a key to searching. Then the data input/output control unit 103 obtains the file index and recognizes a storage location of the top divided piece of data, based on the entry cluster number shown in the file index. Next, the data input/output control unit 103 instructs the first FAT updating unit 104 to read the first FAT 121 and obtains the first FAT 121. Finally the data input/output control unit 103 traces clusters shown by pointers in the first FAT to read the data of the file from clusters.

The restoration processing control unit 110 includes a file index comparing unit 111, a FAT comparing unit 112, and a restoration processing unit 113, and performs a restoration processing in rebooting of the data recording apparatus 100 after interruption of data updating.

The file index comparing unit 111 judges whether the temporary index 129 exists or not.

More specifically, the file index comparing unit 111 judges whether a predetermined bit (flag bit) is "1" or "0". The flag bit is allocated specifically for storing the flag in the temporary index. When "1" is stored in the flag bit, the file index comparing unit 111 judges that the temporary index 129 exists; when "0" is stored in the flag bit, the file index comparing unit 111 judges that the temporary index 129 does not exist.

When the temporary index 129 does not exist, the file index comparing unit 111 outputs a notification of the result (hereinafter called "no existence notification") to the restoration processing unit 113. The no existence notification indicates that the temporary index 129 does not exist.

On the other hand, when the temporary index 129 exists, the file index comparing unit 111 reads this temporary index 129 and recognizes a storage location of a file index corresponding to the sector number shown in the temporary index 129, for example, a storage location of the file index 123. Then, the file index comparing unit 111 reads the file index 123 and judges whether the index main items shown in the temporary index 129 match the index main items shown in the file index 123.

Then, when they match, the file index comparing unit 111 outputs a notification that they match (hereinafter called "index match notification") to the restoration processing unit 113, otherwise the file index comparing unit 111 outputs a notification that they do not match (hereinafter called "index mismatch notification") to the restoration processing unit 113.

The FAT comparing unit 112 reads the first FAT 121 and the second FAT 122 in accordance with an instruction by the restoration processing unit 113. Then the FAT comparing unit 112 compares the contents of them and judges whether they match or not. When they match, the FAT comparing unit 112 outputs a notification that they match (hereinafter called "FAT match notification") to the restoration processing unit 113, otherwise the FAT comparing unit 112 outputs a notification that they do not match (hereinafter called "FAT mismatch notification").

When receiving the index match notification or the index mismatch notification from the file index comparing unit 111, the restoration processing unit 113 instructs the FAT comparing unit 112 to read the first FAT 121 and the second FAT 122, compare the contents of them, and judge whether they match or not. Accordingly, the FAT comparing unit 112 receives the FAT match notification or the FAT mismatch notification.

On the other hand, when receiving the no existence notification from the file index comparing unit 111, the restoration processing unit 113 judges that restoration processing is not necessary and ends the restoration processing.

If receiving a notification except the no existence notification, in other words, the index match notification or the index mismatch notification, the restoration processing unit 113 judges whether the notification from the FAT comparing unit 112 is the FAT match notification or the FAT mismatch notification. Then, if it is the FAT match notification, the restoration processing unit 113 instructs the temporary index deleting unit 108 to delete the temporary index 129.

If the notification is the FAT mismatch notification, the restoration processing unit 113 judges whether the notification from the file index comparing unit 111 is the index match notification or the index mismatch notification. Then, if it is the index match notification, the restoration processing unit 113 instructs the first FAT updating unit 104 and the second FAT updating unit 105 to write the first FAT 121 over the second FAT 122.

On the other hand, if the notification from the file index comparing unit 111 is the index mismatch notification, the restoration processing unit 113 instructs the first FAT updating unit 104 and the second FAT updating unit 105 to write the second FAT 122 over the first FAT 121.

When receiving the data deleting notification from the data updating unit 109, the temporary index deleting unit 108 deletes the temporary index 129 from the storage unit 102.

<Data>

The following explains data stored in the storage unit 102 of the data recording apparatus 100 constructed as described above.

Figure 4:
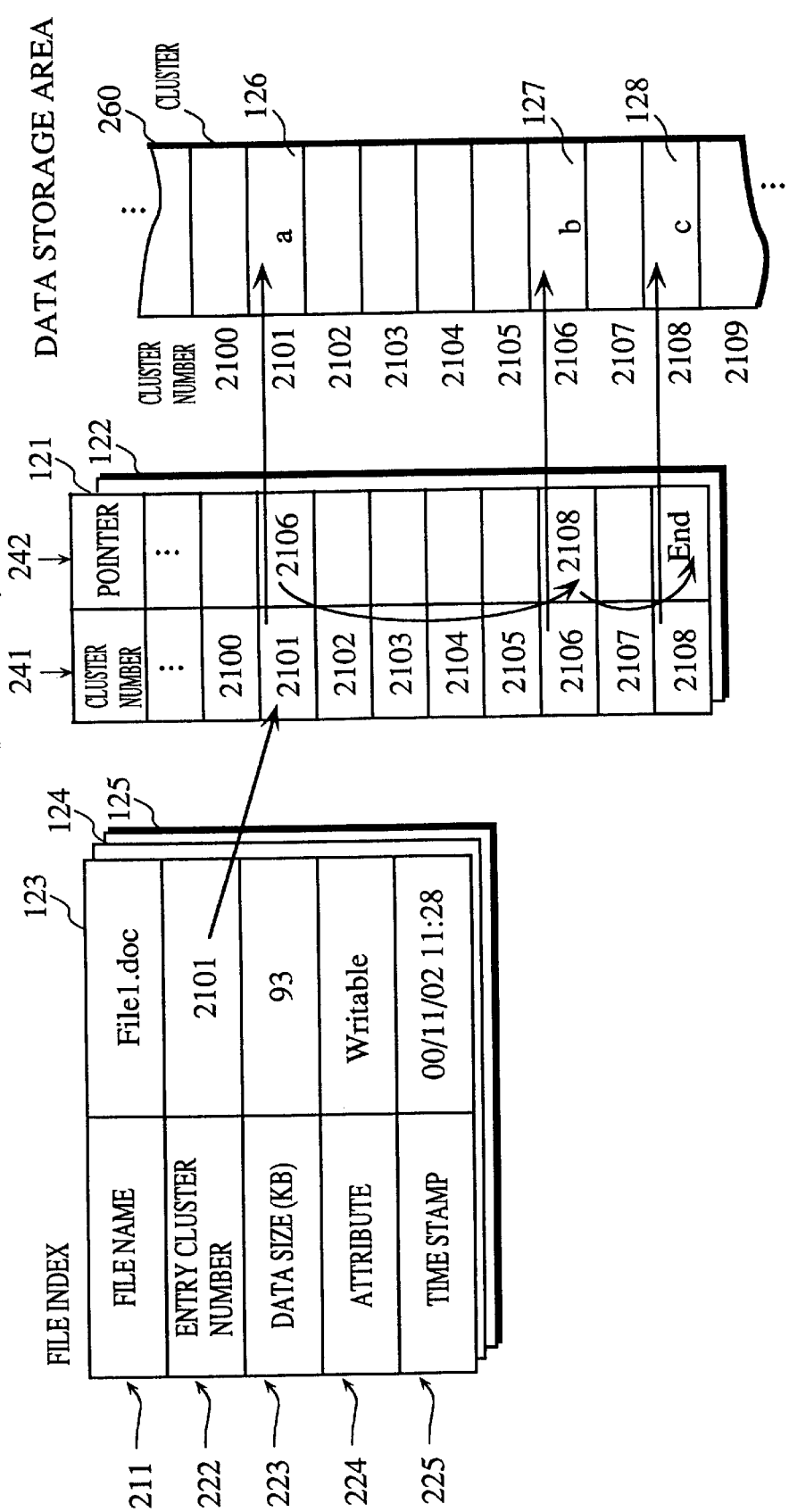
FIG. 4 shows a logical structure of a first FAT, a second FAT, file indexes, and divided pieces of data stored in a storage unit of the data recording apparatus in the embodiment.

FIG. 4 shows a logical structure of the first FAT 121, the second FAT 122, file indexes 123, 124, 125, . . . , and divided pieces of data 126, 127, 128, . . . , stored in the storage unit 102.

Each of the file indexes 123, 124, 125, . . . , is a table which includes management information of a file. Since data structures of them are the same, only a data structure of the file index 123 is explained as an example.

A file name field 211 shows a name of a file related to the file index 123, namely a file managed by the file index 123. This file name is used as a search key.

An entry cluster number field 222 shows the number of a cluster that stores the top divided piece of data of the file.

A data size (KB) field 223 shows a total data size of all of the divided pieces of data included in the file in kilo bytes.

An attribute field 224 shows an attribute of the file, and the file attribute indicates whether the file admits to be written, or the like.

A time stamp field 225 shows a date and a time when the file index 123 was generated or updated.

The first FAT 121 and the second FAT 122 are tables obtained by duplexing a FAT. Therefore, except during update processing and after occurring abnormality in the update processing, their contents are the same.

Here a data structure of the first FAT 121 is explained as an example.

A cluster number column 241 shows a number which specifies a cluster, namely a cluster number.

When a divided piece of data is stored in the cluster specified by the corresponding field in the cluster number column 241, a pointer column 242 shows a cluster number of a cluster storing a following divided piece of data.

At this time, if there is no following divided piece of data, the field in the pointer column 242 shows an End code to indicate that the following divided piece of data does not exist.

Here, if a cluster specified by the cluster number column 241 does not store a divided piece of data, the cluster does not store any data.

A data storage area 260 is a group of clusters. Each cluster is assigned to a number that specifies a storage location in the data storage area 260.

The pieces of data 126, 127, 128, . . . , are stored, based on storage locations and a data sequence shown in the first FAT and the second FAT.

FIG. 5 shows a logical structure of the temporary index 129 which is temporarily stored in the storage unit 102 during update processing.

The temporary index 129 has a similar data structure to the file index 123, 124, 125, . . . , and includes the same contents of a new file index, namely index main items, and other management information.

First, the contents of the temporary index 129 are explained with showing the index main items.

A file name field 301 shows a name of the file, which is used after update processing.

An entry cluster number field 302 shows the number of a cluster that stores the top divided piece of data of the file.

A data size (KB) field 303 shows a total data size of all of the divided pieces of data included in the file in kilo bytes.

An attribute field 304 shows an attribute of the file, and the file attribute indicates whether the file admits to be written, or the like.

A time stamp field 305 shows a date and a time when the temporary index 129 was stored.

The above index main items are also used as the contents of the new file index.

Next, other pieces of information except the index main items are explained below.

A sector number field 306 and a flag field 307 are the added pieces of information.

When a target file index exists in the storage unit 102, the sector number field 306 shows the number of the sector that stores the target file index. Here, the target file index is a file index which is being updated.

When a new file is generated, the sector number field 306 does not show anything.

The flag field 307 shows a flag "1" during update processing, which indicates update processing is being performed, otherwise the flag field 307 shows a flag "0", which indicates update processing is not being performed.

Although the temporary index 129 is generated and stored in the storage unit 102 in each time of update processing, the existence of the temporary index 129 can be judged by checking only the flag bit. This is because the above contents from the file name to the flag are stored in each predetermined storage location in the storage unit 102.

<Update Processing>

The following explains a data update processing performed by the recording control 101.

Figure 6:
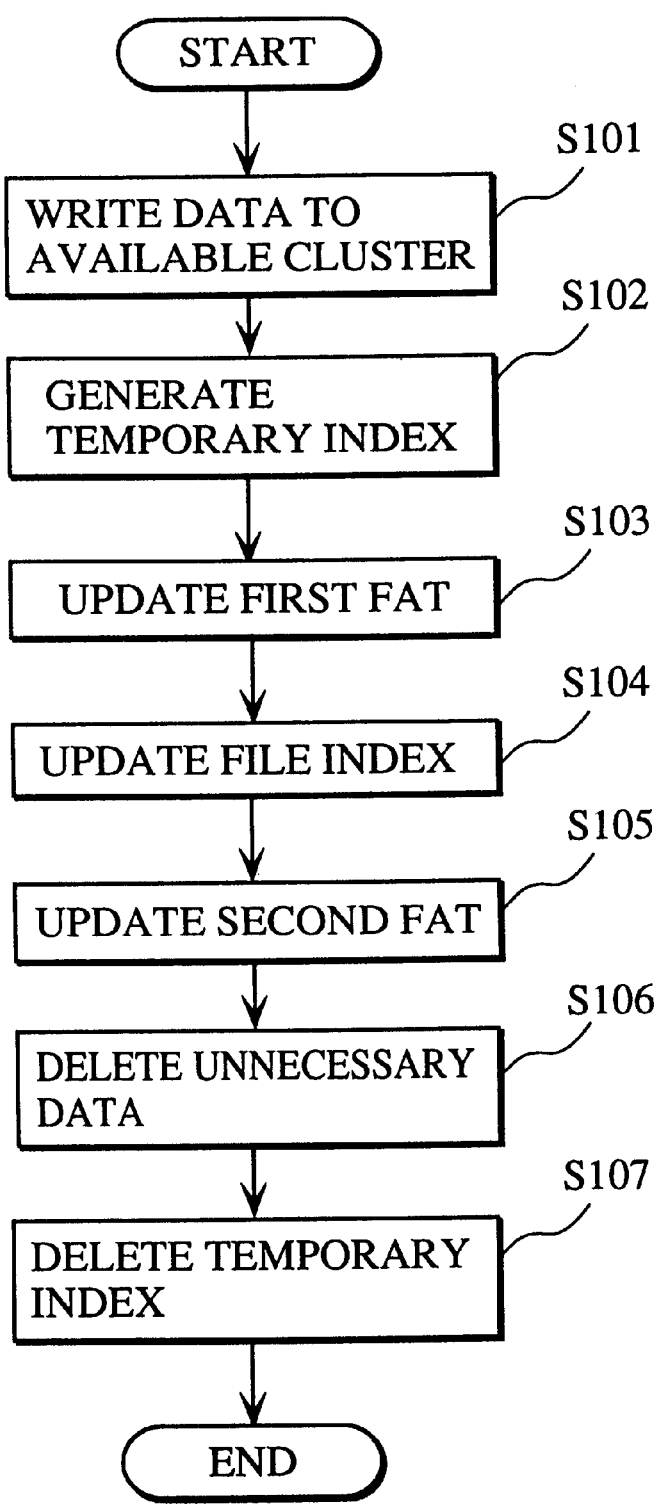
FIG. 6 is a flowchart showing data update processing performed by a recording control unit.

FIG. 6 is a flowchart showing update processing of data stored in the storage unit 102 performed by the recording control unit 101.

The data updating unit 109 divides update data by cluster and stores them in clusters from the top divided piece of data in accordance with FAT information. When completing storing all of the divided pieces of data, the data updating unit 109 outputs a data writing completion notification to the temporary index generating unit 107 (S101).

When receiving the data writing completion notification, the temporary index generating unit 107 generates a new temporary index 129 corresponding to the update divided pieces of data, in accordance with an updating instruction and the FAT information which are received from the data input/output control unit 103. Then, the temporary index generating unit 107 stores the temporary index 129 in the storage unit 102 and outputs a storing completion notification to the first FAT updating unit 104 (S102).

When storing the temporary index 129 in the storage unit 102, the temporary index generating unit 107 also outputs the temporary index 129 to the file index updating unit 106.

Next, when receiving (a) the FAT information from the data input/output control unit 103 and (b) the storing completion notification from the temporary index generating unit 107, the first FAT updating unit 104 updates the first FAT 121, based on the FAT information. Then the first FAT updating unit 104 writes it into the first FAT storage area as the new first FAT 121 and outputs a first FAT updating completion notification to the file index updating unit 106 (S103).

Moreover, when receiving the first FAT updating completion notification from the first FAT updating unit 104, the file index updating unit 106 writes index main items shown in the temporary index 129 which is received from the temporary index generating unit 107 over the target file index, and outputs a file index updating completion notification to the second FAT updating unit 105 (S104).

When receiving the file index updating completion notification from the file index updating unit 106, the second FAT updating unit 105 obtains the first FAT 121, which has been updated, through the first FAT updating unit 104 and updates the second FAT 122 by writing the first FAT 121 over the existing second FAT 122 as the new second FAT 122. Then, the second FAT updating unit 105 outputs a second FAT updating completion notification (S105).

When receiving the second FAT updating completion notification from the second FAT updating unit 105, the data updating unit 109 deletes data which becomes unnecessary after the data updating and outputs a data deleting notification to the temporary index deleting unit 108 (S106).

Furthermore, when receiving the data deleting notification from the data updating unit 109, the temporary index deleting unit 108 deletes the temporary index 129 from the storage unit 102 (S107) and ends the update processing.

<Restoration Processing>

The following explains restoration processing performed after the above update processing is interrupted by a power failure or the like.

Figure 7:
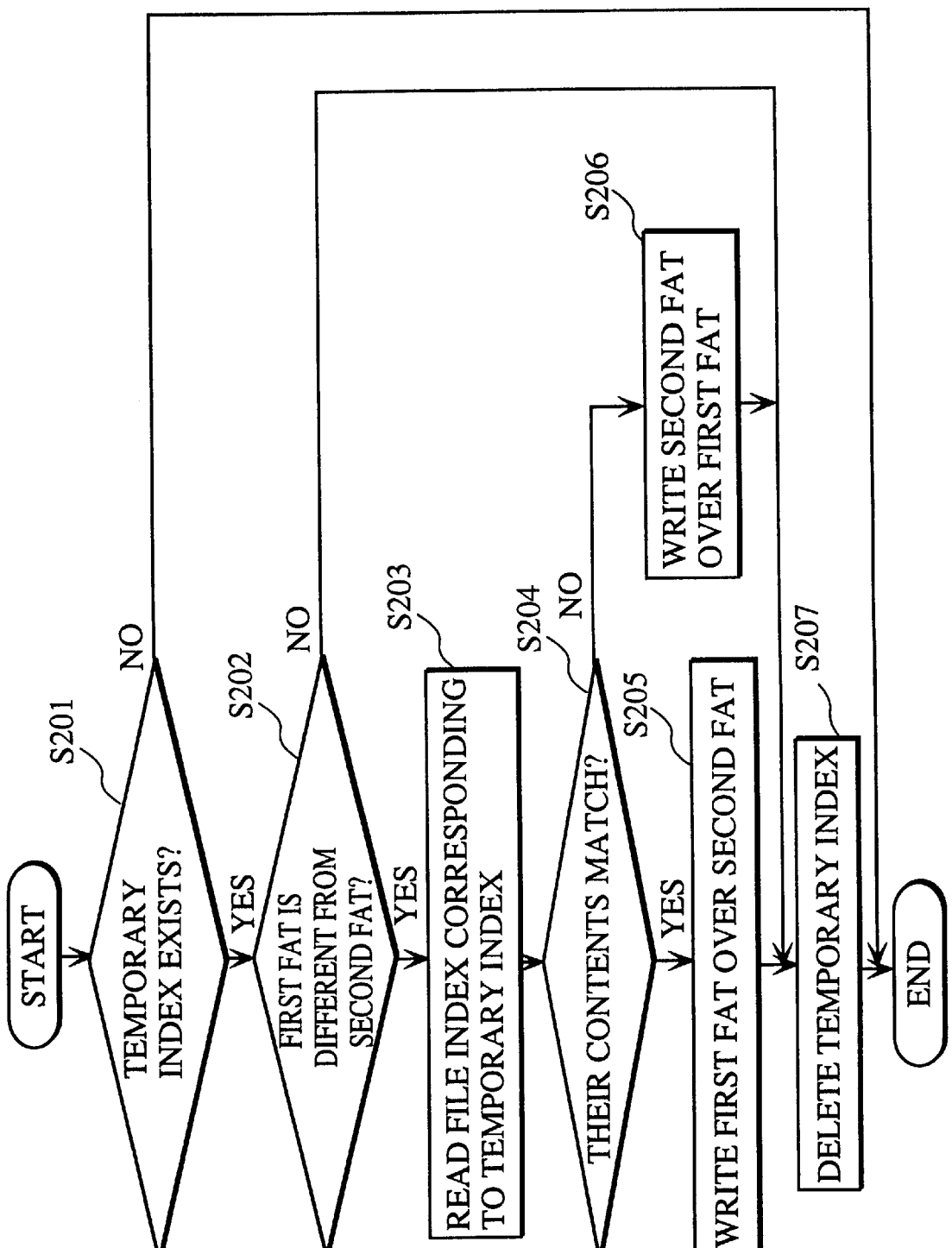
FIG. 7 is a flowchart showing restoration processing performed in the storage unit.

FIG. 7 is a flowchart showing restoration processing performed by the recording control unit 101.

When the data recording apparatus 100 is rebooted or has a system error, or the like, the file index comparing unit 111 judges whether the temporary index 129 exists or not in the storage unit 102 (S201). When the temporary index 129 does not exist, the restoration processing is ended.

On the other hand, when the temporary index 129 exists, the FAT comparing unit 112 reads the first FAT 121 and the second FAT 122, compares the contents of them, and judges whether they match or not (S202).

When they match, the temporary index deleting unit 108 deletes the temporary index 129 from the storage unit 102, and the restoration processing is ended.

When they do not match, the file index comparing unit 111 compares the contents of the temporary index 129 with the contents of the file index specified by a sector number shown in the temporary index 129, which is the target file index (S203), and judges whether their index main items match or not (S204).

When their index main items match, the second FAT updating unit 105 writes the first FAT 121 over the existing second FAT 122 as the new second FAT 122 (S205). Then, the temporary index deleting unit 108 deletes the temporary index 129 from the storage unit 102 (S207), and the restoration processing is ended.

On the other hand, when their index main items do not match, the first FAT updating unit 104 writes the second FAT 122 over the existing first FAT 121 as the new first FAT (S206). Then, the temporary index deleting unit 108 deletes the temporary index 129 from the storage unit 102 (S207), and the restoration processing is ended.

FIG. 8 shows the states of old data, new data, a file index, a temporary index, the first FAT, and the second FAT after each of the above steps from S101 to S107. Arrows show changes of the data or the like in restoring consistency from the state of them in each of the above steps.

In restoring consistency from the state in the step S101, the state of data or the like does not change, and the new data which has just stored for updating is left there.

In this way, the need of restoration processing can be easily judged by checking the flag bit in the temporary index 129, and by checking the sector number of the temporary index 129, the temporary index 129 can be compared with only the target file index without checking other file indexes. By comparing the first FAT 121 with the second FAT 122 in addition, a method of restoring, which is changing to the old state or changing to the new state, is determined without comparing all the contents of the first FAT with those of the second FAT. As a result, the restoration processing time is shortened.

Here, although the storage unit 102 is a storage medium such as a hard disc in the above embodiment of the present invention, a semiconductor memory, an optical magnetic disc, or the like may be used instead.

Also, although the sector number field 306 shows the number of a sector storing a target file index in the storage unit 102 in the above embodiment, the number of a cluster which includes the sector or a pass name which leads to the data stored in the sector may be used instead.

Moreover, the restoration processing can be performed by writing the proper contents over the improper contents without judging whether the contents of the first FAT and the second FAT match or not.

Furthermore, although the data recording apparatus 100 in the embodiment is used for the file system using a FAT and a file index, the present invention is effective to file systems using other databases as alternatives of the FAT and the file index such as NTFS (New Technology File System), in other word, a database which shows storage locations in a storage medium and a data sequence of divided pieces of data that form a file and a database which shows a file name and a storage location of the top divided piece of data of the file.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data updating apparatus for updating a file in a storage medium which stores: (a) one or more files including the file to be updated, each file including a plurality of pieces of data, (b) a first table and a second table, both tables containing an indicator of a storage location in the other medium for each piece of data and a sequence for the plurality of pieces of data in the file, and (c) index information corresponding to the file, the index information associating the file name with a storage location of a predetermined piece of data in the file, the improvement in the data updating apparatus comprising:

means for generating and writing temporary index information into the storage medium, the temporary index information including (i) address information indicating a storage location of the corresponding file index and (ii) new contents to which the corresponding file index is to be updated;

means for updating the first table in response to completion of the writing of temporary index information into the storage medium;

means for updating the second table upon the file index being updated; and means for deleting the temporary index information from the storage medium after the second table is updated.

2. The data updating apparatus of claim 1 further comprising:

means for determining whether the temporary index information exists in the storage medium after an incompletion during the updating of the file results in incompletion; and means for restoring consistency when the temporary index information exists by (a) reading the corresponding index information for the file, (b) comparing contents of the corresponding file index information with the contents of the temporary index information, and (c) restoring consistency by (i) changing the second table to have the contents of the first table when the contents of the corresponding file index information match the contents of the temporary index information, or (ii) changing the first table to have the contents of the second table when the contents of the corresponding file index information do not match the contents of the temporary index information.

3. The data updating apparatus of claim 2, wherein the temporary index information generating/writing means sets a predetermined bit in the storage medium to a first value when writing the temporary index information, the temporary index information deleting means sets the predetermined bit to a second value which is different from the first value when deleting the temporary index information, and the determining means makes a judgment, based on the predetermined bit.

4. The data updating apparatus of claim 3, wherein the restoring means deletes the index identifying information from the storage medium and sets the predetermined bit to the second value after completing the restoring function.

5. The data updating apparatus of claim 2, wherein the restoring means deletes the index identifying information from the storage medium after completing the restoring function.

6. A data updating method for updating a file in a storage medium which stores: (a) one or more files including the file to be updated, each file including a plurality of pieces of data, (b) a first table and a second table, both tables containing an indicator of a storage location in the storage medium for each piece of data and a sequence for the plurality of pieces of data in the file, and (c) index information a corresponding to the file, the index information associating the file name with a storage location of a predetermined piece of data in the file, the data updating method comprising the steps of:

generating and writing temporary index information into the storage medium, the temporary index information including (i) address information indicating a storage location of the corresponding file index and (ii) new contents to which the corresponding file index is to be updated;

updating the first table in response to completion of the writing of temporary index information into the storage medium;

updating the second table upon the file index being updated; and deleting the temporary index information from the storage medium after the second table is updated.

7. The data updating method of claim 6 further comprising the steps of:

determining whether the temporary index information exists in the storage medium after an incompletion during the updating of the file; and restoring consistency, when the temporary index information exists, by
 (a) reading the corresponding index information for the file,
 (b) comparing contents of the corresponding file index information with the contents of the temporary index information, and
 (c) restoring consistency by (i) changing the second table to have the contents of the first table when the contents of the corresponding of file index information match the contents of the temporary index information, or (ii) changing the first table to have the contents of the second table when the contents of the corresponding file index information do not match the contents of the corresponding piece of index information.

8. A computer-readable storage medium that stores a data updating program to update a file in a storage medium which stores: (a) one or more files including the file to be updated, each file including a plurality of pieces of data, (b) a first table and a second table, both tables containing an indication of a storage location in the storage medium for each piece of data and a sequence for the plurality of pieces of data in the file, and (c) index information corresponding to the file, the index information associating the file name with a storage location of a predetermined piece of data in the file, the data updating program comprising the steps:

generating and writing temporary index information into the storage medium, the temporary index information including (i) address information indicating a storage location of the corresponding file index and (ii) new contents to which the corresponding file index is to be updated;

updating the first table in response to completion of the writing of temporary index information into the storage medium;

updating the second table upon the file index being updated; and deleting the temporary index information from the storage medium after the second table is updated.

* * * * *

UNITED STATES PATENT AND TRADEMARK OFFICE
CERTIFICATE OF CORRECTION

PATENT NO.    : 6,675,180 B2
DATED         : January 6, 2004
INVENTOR(S)   : Yamashita It is certified that error appears in the above-identified patent and that said Letters Patent is hereby corrected as shown below:

Column 15,
Line 32, after the word "information" and before the word "corresponding" please delete the word "a".

Column 16,
Line 15, after the word "corresponding" and before the word "file" please delete the word "of".

Signed and Sealed this

Thirtieth Day of November, 2004

JON W. DUDAS
*Director of the United States Patent and Trademark Office*